Figure 1:
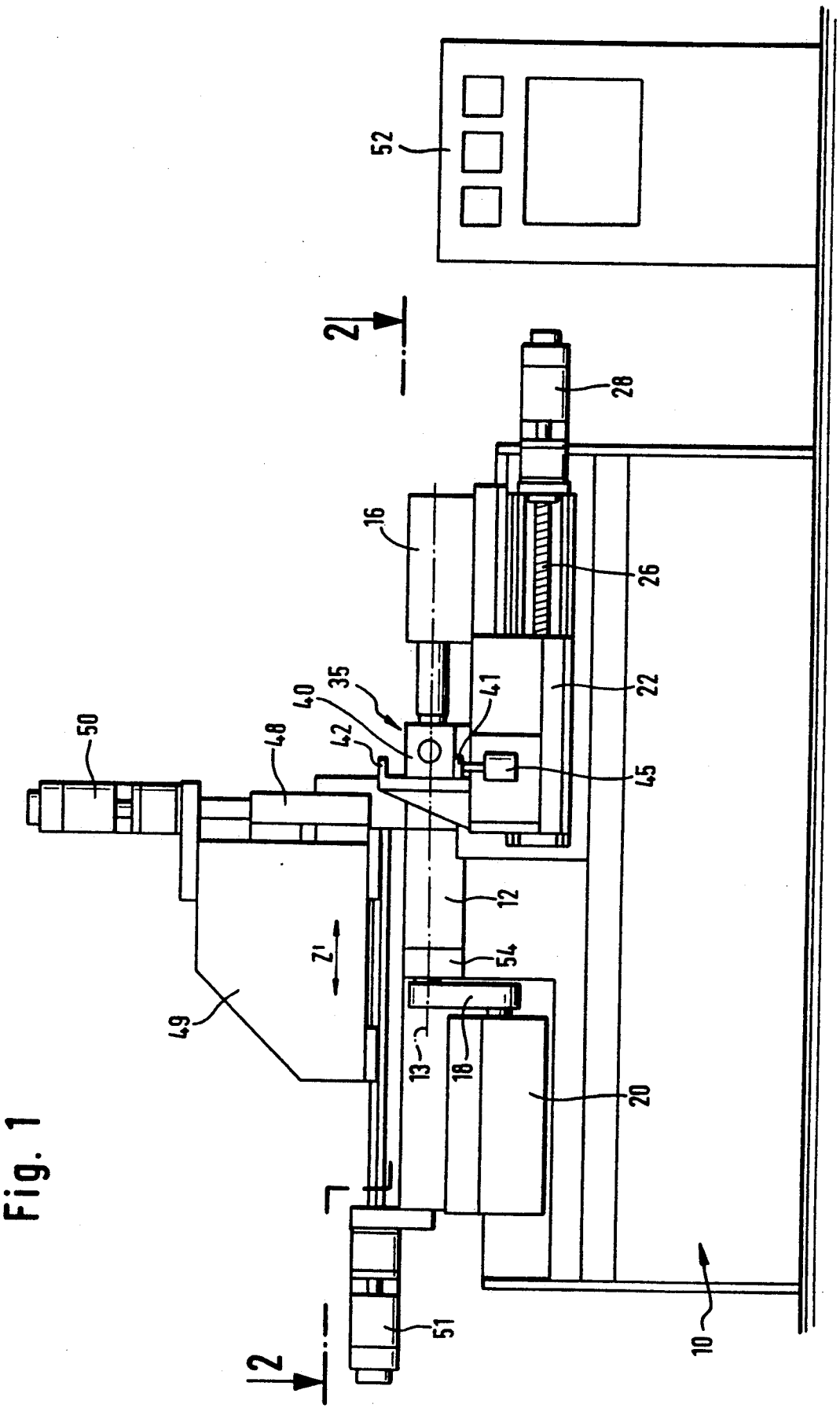

United States Patent [19]

Fritz et al.

[11] Patent Number: 5,284,076
[45] Date of Patent: Feb. 8, 1994

[54] DEVICE FOR THE NON-CIRCULAR MACHINING OF WORKPIECES

[75] Inventors: Hermann Fritz, Mutlangen; Hans Staiger, Goeppingen; Hans Straub; Friedrich Winckler, Schwaebisch Gmuend, all of Fed. Rep. of Germany

[73] Assignee: Ex-Cell-O GmbH, Eislingen, Fed. Rep. of Germany

[21] Appl. No.: 766,821

[22] Filed: Sep. 27, 1991

[30] Foreign Application Priority Data

Oct. 2, 1990 [DE] Fed. Rep. of Germany ....... 4031091

[51] Int. Cl.$^5$ .................................. B23B 5/24
[52] U.S. Cl. ........................... 82/118; 82/158; 82/900; 318/687; 364/474.37
[58] Field of Search .............. 82/158, 118, 900; 318/687; 364/474.37, 551.02; 384/12; 408/14, 16, 241 S, 202; 409/218; 51/2 C, 105 EC, 254

[56] References Cited

U.S. PATENT DOCUMENTS

| | | | |
|---|---|---|---|
| 4,203,062 | 3/1988 | Bathen | 318/571 |
| 4,203,062 | 5/1980 | Bathen | 318/571 |
| 4,382,215 | 5/1983 | Barlow et al. | 364/474.37 X |
| 4,491,777 | 1/1985 | Beck et al. | 318/135 X |
| 4,635,532 | 1/1972 | Zerbola | 384/12 |
| 4,646,595 | 3/1987 | Slee | 82/118 |
| 5,005,452 | 4/1991 | Wood, III | 82/133 X |

FOREIGN PATENT DOCUMENTS 0201230 12/1986 European Pat. Off. .
2724808 12/1978 Fed. Rep. of Germany .

*Primary Examiner*—Z. R. Bilinsky
*Attorney, Agent, or Firm*—Barry R. Lipsitz

[57] ABSTRACT

In order to improve a device for the non-circular machining of workpieces comprising a machine frame, a workpiece spindle held on the machine frame and operated as C-axis for a workpiece to be machined, a Z-slide displaceable on the machine frame in the Z-direction in relation to the workpiece spindle and having a Z-axis drive, an X-axis drive in the form of a linear motor arranged on the Z-slide for advancing a tool in the X-direction towards the workpiece, and a numerical control system for activating the X-axis drive in correlation with the rotation of the workpiece spindle, such that more precise work results are obtained, it is proposed that the linear motor serving as X-axis drive be a three-phase asynchronous linear motor with a primary part fixedly arranged in the X-direction on the Z-slide and a secondary part movable relative to the primary part.

58 Claims, 14 Drawing Sheets

DEVICE FOR THE NON-CIRCULAR MACHINING OF WORKPIECES

The invention relates to a device for the noncircular machining of workpieces comprising a machine frame, a workpiece spindle held on the machine frame and operated as C-axis for a workpiece to be machined, a Z-slide displaceable on the machine frame in the Z-direction in relation to the workpiece spindle and having a Z-axis drive, an X-axis drive in the form of a linear motor arranged on the Z-slide for advancing a tool in the X-direction towards the workpiece, and a numerical control system for activating the X-axis drive in correlation with the rotation of the workpiece spindle.

Such a device for the non-circular machining of workpieces is known from EP-A-0 201 230.

The X-axis drive used in this device operates with a plunger-type coil linear motor and with respect to the achievable actuating power and guiding accuracy fails to meet the very high precision requirements in the non-circular machining of workpieces, in particular pistons, as these pistons exhibit in both the X- and Z-directions deviations from an ideal cylinder which should be machined as accurately as possible.

The object underlying the invention is, therefore, to improve a device of the generic kind with respect to its guiding accuracy and actuating power in order to obtain more precise work results.

This object is accomplished in accordance with the invention in a device of the kind described at the beginning by the linear motor serving as X-axis drive being a three-phase asynchronous linear motor with a primary part fixedly arranged in the X-direction on the Z-slide and a secondary part movable relative to the primary part.

By using a three-phase asynchronous linear motor with a movable secondary part and a stationary primary part, firstly the problem of supplying the movable part with power is solved and, secondly, a substantially higher actuating power and hence substantially more precise guidance of the tool are achieved with the use of a novel motor principle.

A further advantage of using a three-phase asynchronous linear motor is that the secondary part is displaceable over large distances with precise positioning in the X-direction so that the total stroke required in the X-direction is achievable by the linear motor and so there is no necessity for an additional, numerically controlled X-axis on which the X-axis drive required for the rapid non-circular machining is located. Hence the use of a three-phase asynchronous linear motor makes it possible to carry out all adjustment motions in the direction of the X-axis with it alone without an additional, also numerically controlled X-axis.

In the simplest case, the linear motor can comprise one primary part. However, this has the disadvantage that asymmetrical forces act on the secondary part transversely to the X-direction. For this reason, it is particularly advantageous for the linear motor to be a double-comb-type linear motor with two opposed primary parts which enclose the secondary part between them so that the forces acting on the secondary part transversely to the X-direction essentially counterbalance one another.

Particularly favorable spatial relations are achieved in an inventive linear motor by the primary part projecting beyond the secondary part in the X-direction.

Moreover, the spatial relations can be further improved by the primary part projecting beyond the secondary part in the direction transverse to the X-direction.

Particularly high precision of the adjustment motion is achievable with the inventive linear motor by the secondary part being guided on both sides of the same with bearings arranged in spaced relation to one another in the X-direction.

With a view to achieving as compact a design of the X-axis drive as possible, the bearings are preferably arranged on both sides of the primary part.

Structurally, it is particularly advantageous for the secondary part to extend in a cantilever manner between the bearings arranged on both sides of the primary part as, in this case, too, the conduction of the flux through the secondary part can be implemented in a particularly simple way and there are no disturbing influences from the bearings for guiding the secondary part between the primary parts.

In order for the tool carrier to be of as lightweight design as possible and to be capable of being subjected to as high acceleration as possible, it is advantageous for the secondary part to form a carrying section of the tool carrier and to thus contribute towards its rigidity.

It is particularly advantageous for a longitudinal section of the tool carrier to be exclusively formed by the secondary part and, therefore, for there to be no necessity for additional reinforcing elements which, in turn, would make the tool carrier and hence the movable part heavier.

Particularly when the secondary part forms a carrying section of the tool carrier, it is advantageous for the secondary part to be kept at a constant temperature so that temperature differences in the secondary part do not result in deformation of the tool carrier and hence negatively influence the precision of the X-axis drive.

In the simplest case, a constant temperature of the secondary part is achieved by the latter being kept at a constant temperature by being flushed with oil.

Particularly high precision with a particularly compact design of the X-axis drive is achievable by the bearings for the secondary part simultaneously being the bearings for the tool carrier and guiding the latter exclusively in the X-direction. The bearings thereby serve to guide both the tool carrier and the secondary part so that an overdetermination of the guidance of the tool carrier is excluded.

In one embodiment, the bearings can be roller bearings which are expediently mechanically prestressed.

It is, however, particularly advantageous for the bearings to be hydrostatic sliding bearings.

These hydrostatic sliding bearings are preferably designed so as to comprise guides arranged in the X-direction stationarily on the Z-slide and sliding pieces displaceable in the guides and connected to the secondary part.

In order for the tool carrier itself to be constructed as lightweight as possible, provision is advantageously made for longitudinal sections of the tool carrier to be formed exclusively by the sliding pieces so that these sliding pieces themselves form carrying longitudinal sections of the tool carrier.

The hydrostatic bearings are preferably designed so as to comprise oil pockets which are acted upon by oil under pressure. Particularly advantageous, precise guidance of the sliding pieces by the oil pockets is made possible by providing an oil supplying device which controls the oil pressure in the oil pockets in such a way that when the oil pressure rises, the amount of oil flowing through the pockets also increases. Hence with this oil supplying device at that instant at which the sliding piece increases the pressure in one of the oil pockets by evasion in one direction, this evading motion is counteracted by the amount of oil flowing through the respective pocket also being additionally increased and by an additional force, therefore, acting on the sliding piece to bring it back into its original, centered position.

Hydrostatic sliding bearings with such an oil supply, therefore, guide in the direction transverse to the X-direction with the extremely high precision required by the object underlying the present invention.

An embodiment is particularly advantageous wherein the oil used for the hydrostatic sliding bearings simultaneously serves for tempering the secondary part.

Furthermore, provision is made in an advantageous embodiment for at least one bearing of the secondary part to comprise a torque supporting means.

It is particularly advantageous for the torque supporting means to comprise hydrostatically supported guiding surfaces. Expediently, these guiding surfaces are hydrostatically supported wedge surfaces.

A favorable arrangement of the tool in relation to the secondary part makes provision for the tool to be arranged on the side of the front bearing located opposite the secondary part.

With this arrangement, it has, furthermore, proven particularly expedient for the bearing located between the secondary part and the tool to be provided with the torque supporting means.

To enable the tool to be changed in a simple way, provision is advantageously made for the tool to be seated in an exchangeable tool holder.

To enable exact positioning of this tool holder, provision is, furthermore, made for the tool carrier to comprise for exact positioning of the tool holder a gauged stop surface for the tool holder to be placed thereagainst.

As a supplement or alternative to the above-described solution, the object mentioned at the beginning is also accomplished in accordance with the invention by providing an X-axis sensor comprising a point of application for measurements arranged in an end region of the tool carrier on the tool side.

With this arrangement of the point of application for measurements in the end region of the tool carrier on the tool side, all inaccuracies which occur due to thermal or load-initiated expansions of the tool carrier in its region located behind this point of application for measurements are eliminated right from the start as the control means always controls the exact drive in such a way that the point of application for measurements precisely assumes the desired X-axis position.

In particular in an embodiment in which a tool holder is used, it is advantageous for the point of application for measurements of the X-axis sensor to lie in the immediate vicinity of the gauged stop surface on the tool carrier as the tool holder can thus be exchanged in a simple way without having to fix the point of application for measurements anew.

However, if a particularly high accuracy is required, it is necessary for the point of application for measurements of the X-axis sensor to lie on the tool holder.

The X-axis sensor itself can be of optional design, it has proven particularly advantageous for the X-axis sensor to comprise a linear incremental sensor preferably having an optically readable scale.

As an alternative to this, it has, however, also proven advantageous for the X-axis sensor to comprise a laser interferometer with which particularly sensitive length measurements in the X-direction are possible.

Such a laser interferometer preferably comprises a measuring head which emits the laser beam and a reflector which reflects the laser beam back to the measuring head. To enable a particularly exact measurement to be made with the laser interferometer, provision is advantageously made for the laser interferometer to comprise a reflector coupled in a temperature-stable manner with the point of application for measurements.

In the simplest case, provision is made for the reflector to be arranged at the point of application for measurements.

To enable measurement of the position of the reflector to be carried out in a particularly simple way by the measuring head arranged at a distance from it, provision is preferably made for a laser beam of the laser interferometer to be guided through a channel. It is thereby made possible to arrange the measurement reflector at the point of application for measurements, i.e., in a region near the tool in which there is considerable development of dirt due to chips and oil, but without the quality of the measurement being impaired by the dirt as the channel protects the laser beam leading to the reflector.

As an alternative or supplement to this, a further expedient embodiment makes provision for the laser beam of the laser interferometer to be guided by a light guide to the reflector and, in particular, for the light guide to terminate directly at the reflector or for it itself to be provided with a reflecting end and to be connected with the latter to the point of application for measurements.

The channel can be led as separate channel to the point of application for measurements. It is, however, particularly advantageous for the channel to extend in the tool carrier.

As the point of application for measurements advantageously lies at the end on the tool side, but for geometrical reasons and reasons of measurement reliability, it is necessary to arrange the measuring head at the end of the tool carrier located opposite the tool, provision is preferably made for the channel to be led from a rear side of the tool carrier opposite the tool in the longitudinal direction of the tool carrier to the point of application for measurements.

An alternative to guiding the laser beam via a channel to the reflector is to be seen in the reflector being connected to the point of application for measurements via a temperature-invariant intermediate element. This intermediate element with temperature-invariant dimensions enables a connection to be established between the point of application for measurements arranged in the region of heavy dirt development and the reflector arranged outside the region of heavy dirt development so as to be able to carry out a proper measurement of the position of the reflector.

The intermediate element can be arranged in many different ways. However, since the point of application for measurements lies on the tool carrier, the intermediate element is preferably likewise arranged on the tool carrier.

It is, however, even more advantageous for the intermediate element to be guided through the tool carrier.

In particular, an embodiment is expedient in which the intermediate element is guided from a rear end of the tool carrier opposite the tool in the longitudinal direction through the tool carrier to the point of application for measurements.

All of the embodiments of the device with an X-axis sensor designed in accordance with the invention can additionally include features of the inventive X-axis drive which are described in detail hereinabove as both solutions contribute towards improving the positioning accuracy and the precision with which the tool is guided for the non-circular machining.

In an advantageous further development of the three-phase asynchronous linear motor according to the invention, provision is preferably made for the secondary part to comprise an iron core with inserted short circuit windings.

The secondary part is expediently designed so as to comprise two short circuit windings lying in planes facing the primary parts.

To create a possibility for guiding a channel for the X-axis sensor through the secondary part, provision is preferably made for a channel for the X-axis sensor to run through between the planes.

Control of the three-phase asynchronous linear motor according to the invention is preferably carried out by positional control of the same by means of flux-oriented current conduction.

In this case, the three-phase asynchronous linear motor is preferably controlled by a computer which calculates set three-phase current values for the linear motor and transmits them to a converter which converts three-phase current from the mains in accordance with the set three-phase current values.

A particularly advantageous variant of the inventive device makes provision for several tools to be spaced in a direction perpendicular to the X- and Z-directions.

To enable these tools to be brought into use in a defined position, provision is made for the linear motor to be displaceable relative to the Z-slide in a tool setting direction extending perpendicular to the Z-direction and X-direction.

In the simplest case where two tools are used, provision is made for the linear motor to be displaceable between two stop positions.

The stop positions are expediently placed such that in each stop position one of the tools of the tool carrier stands in the same cutting plane so that the respective tool brought into use stands in one and the same cutting plane and hence the conditions for the activation of the tool carrier do not change when the tool is changed.

Herein provision is preferably made for one of the tools to be for rough machining and another tool for finishing.

Furthermore, in a further improved embodiment of the inventive device it is advantageous for a further Y'-slide to be provided to carry a Y'-axis drive with which a tool carrier with a tool can be advanced in the Y'-direction towards the workpiece.

The tool that can be advanced in the Y'-direction towards the workpiece is expediently provided for machining annular grooves, preferably annular grooves for piston rings, in the workpiece.

Figure 2:
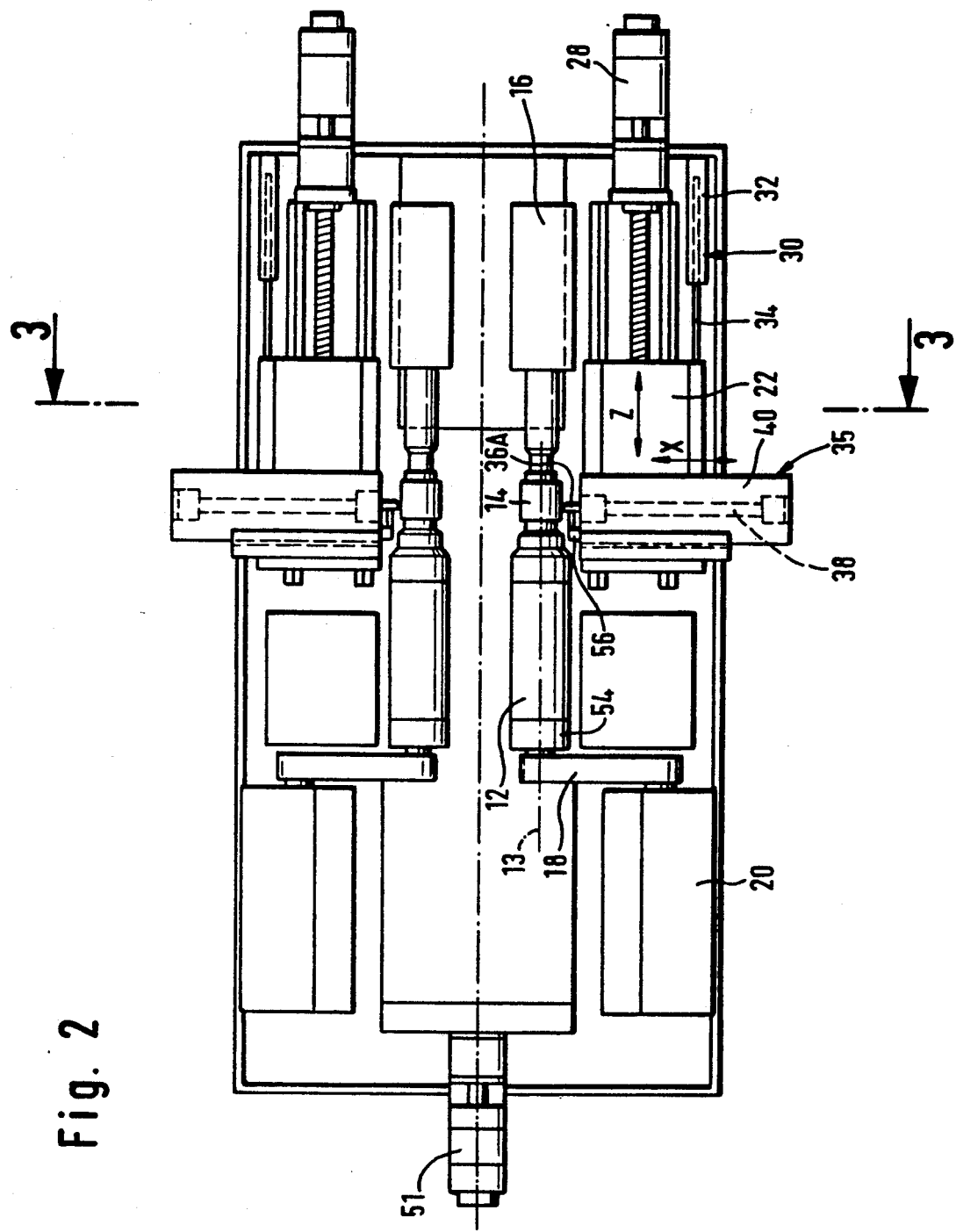
Figure 3:
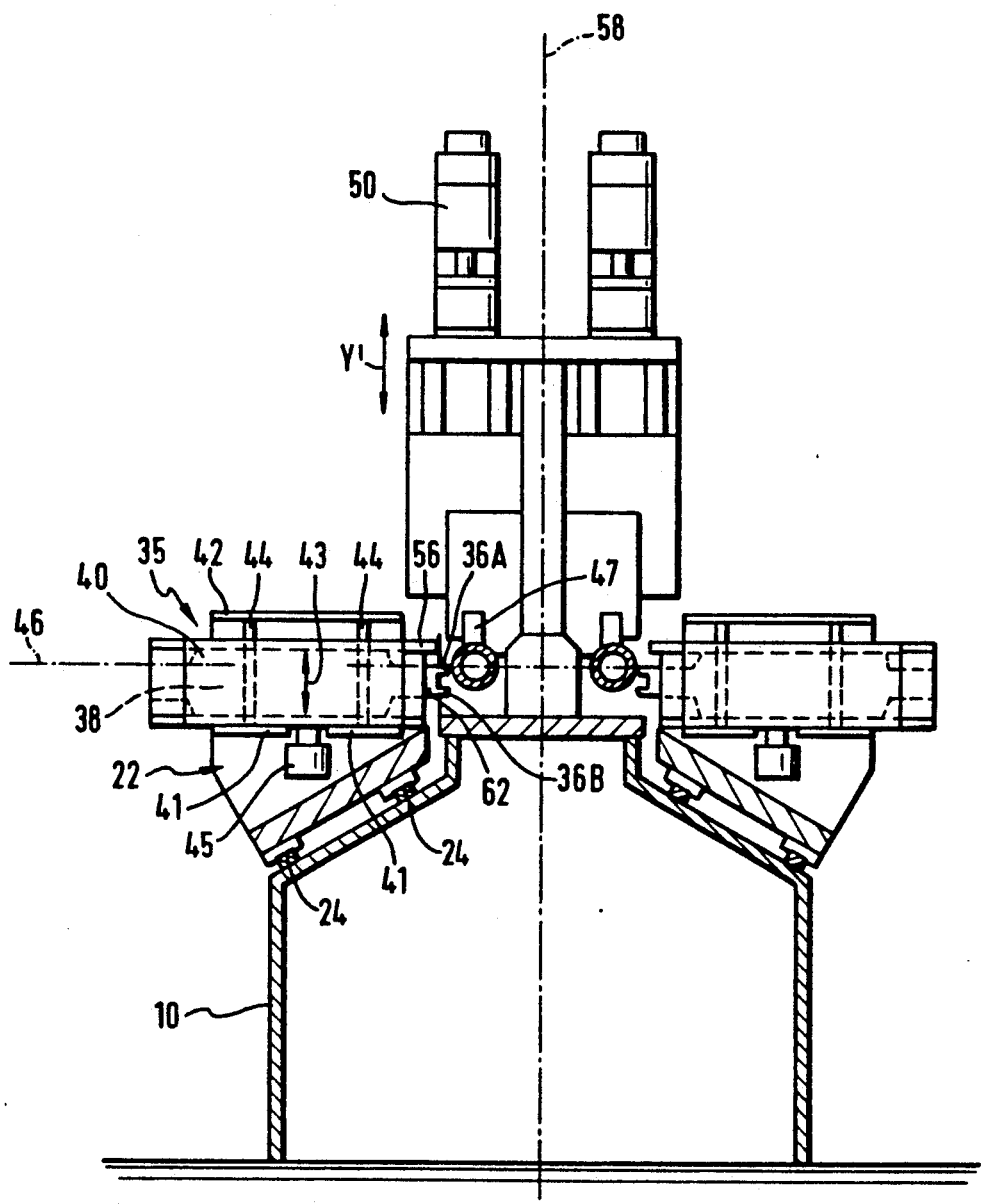
Figure 4:
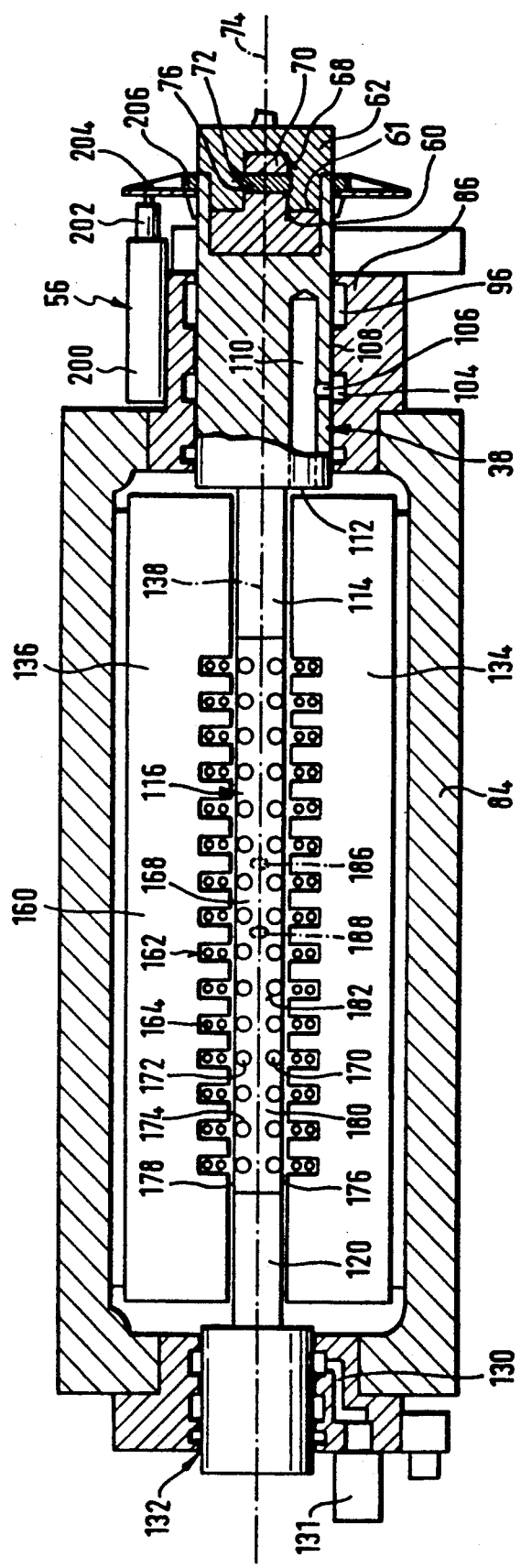
Figure 5:
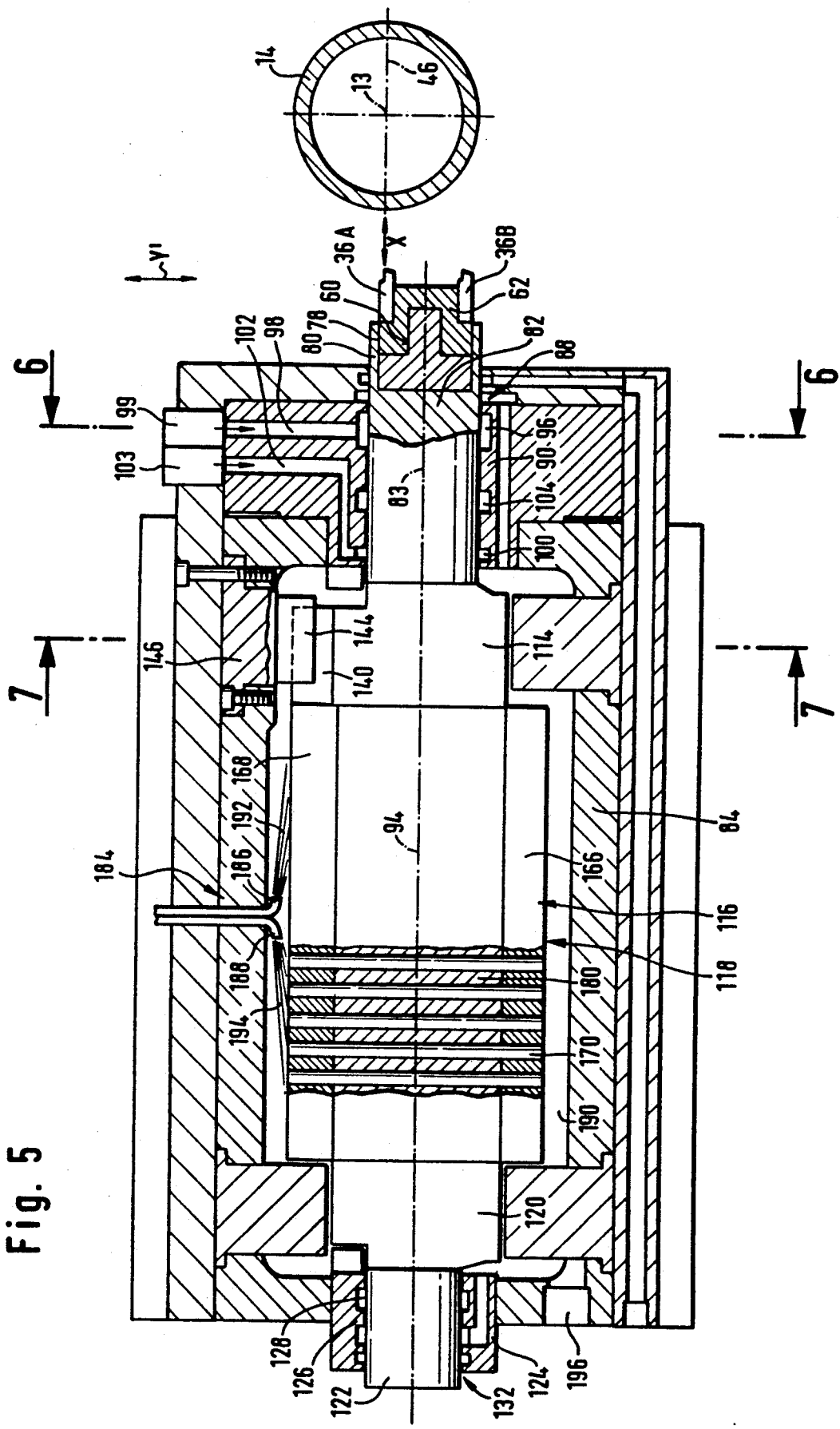
Figure 6:
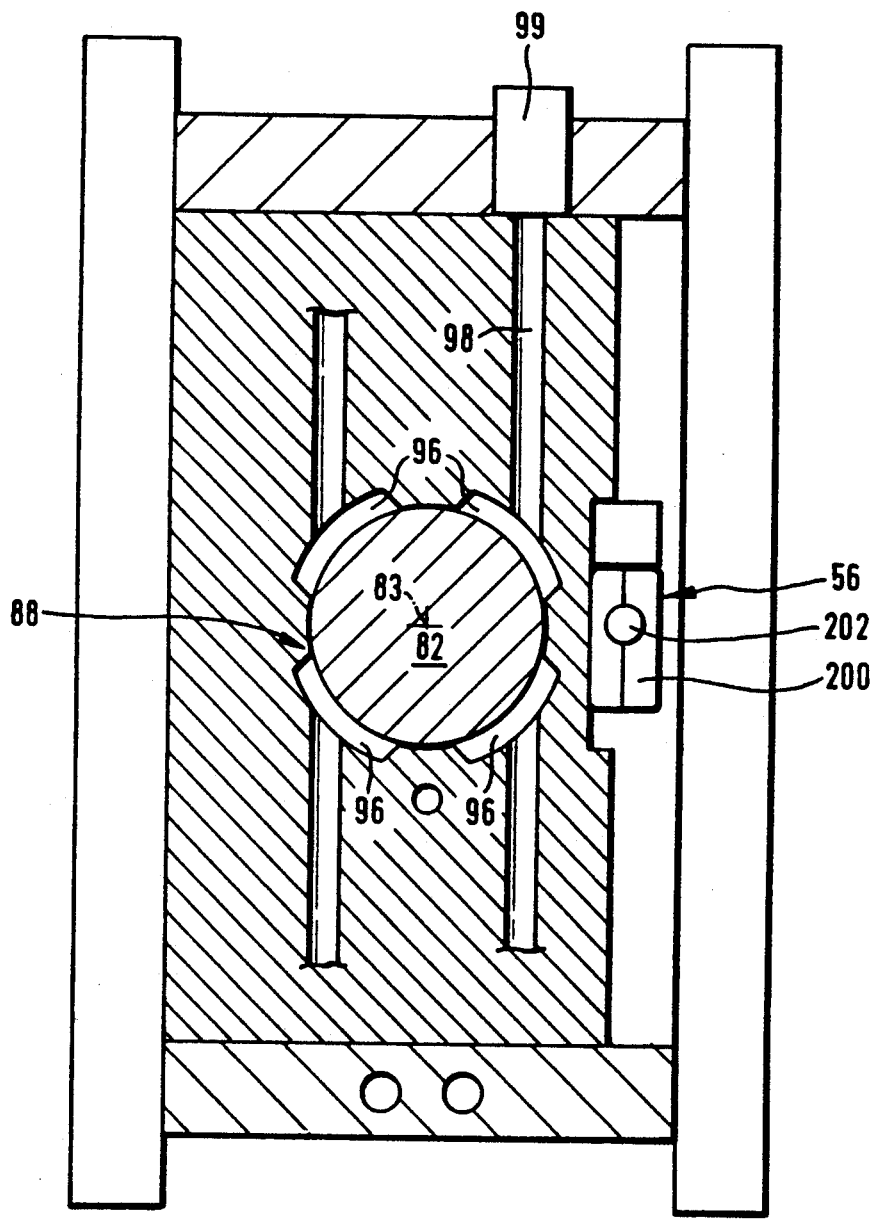
Figure 7:
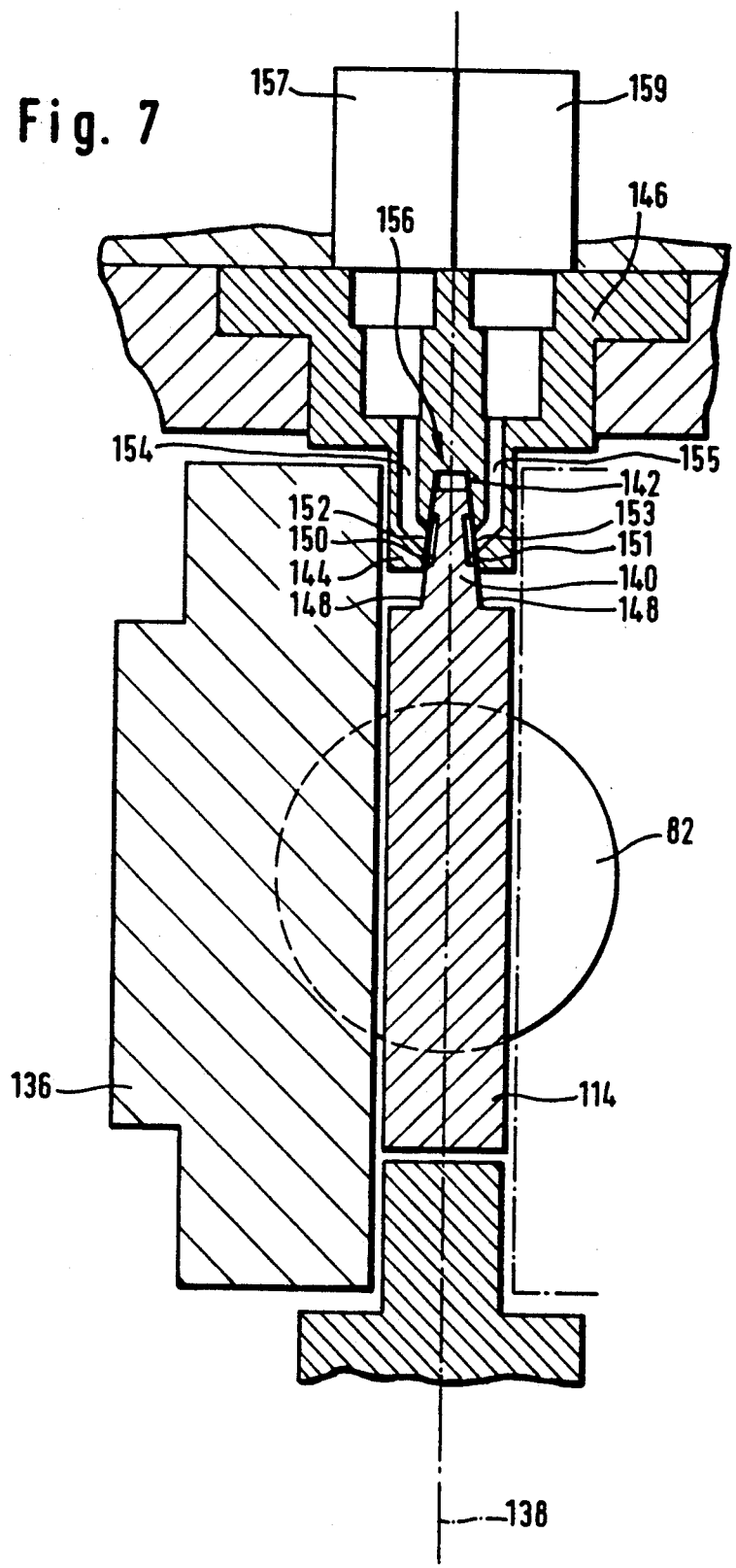
Figure 8:
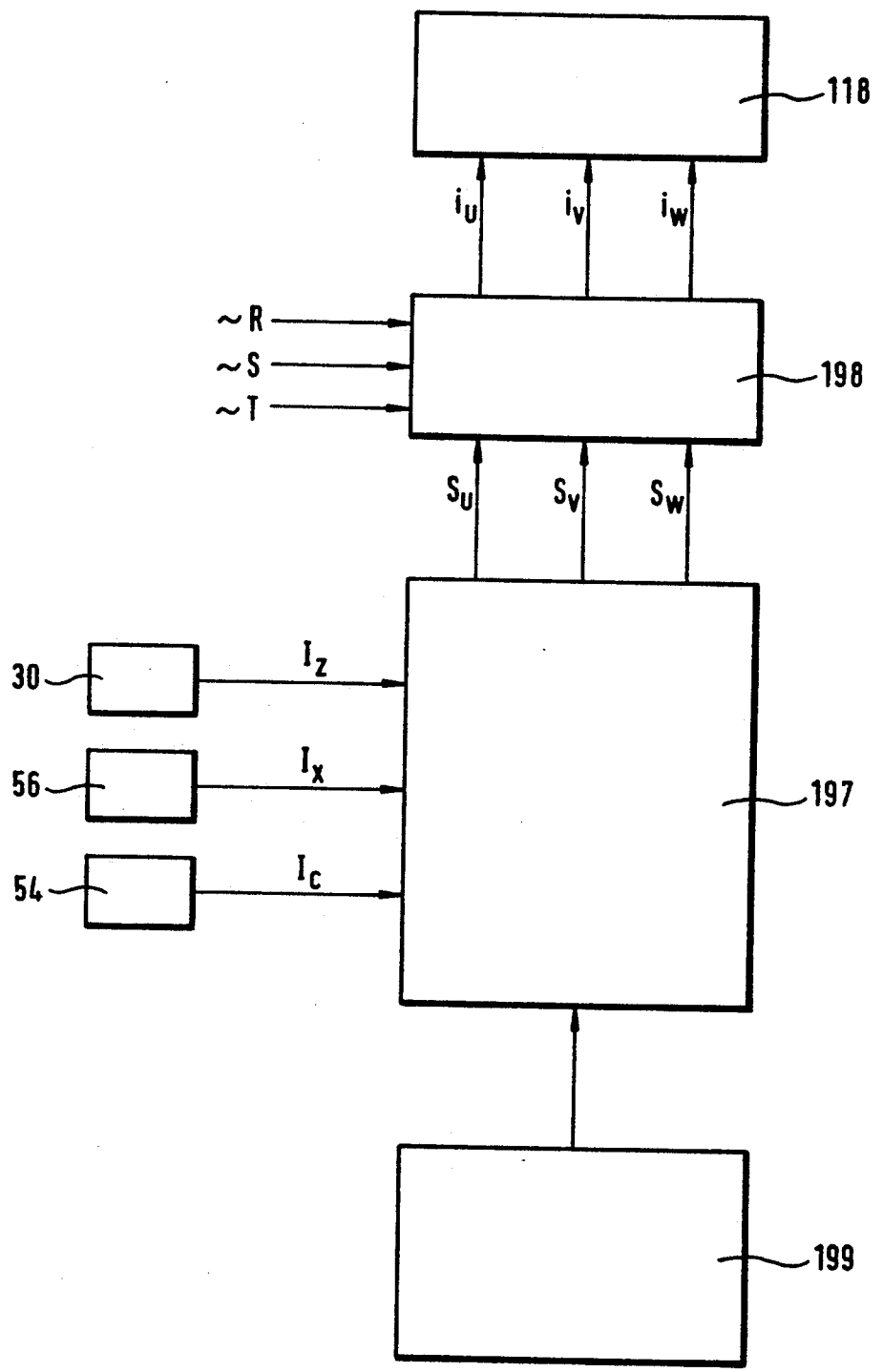
Figure 9:
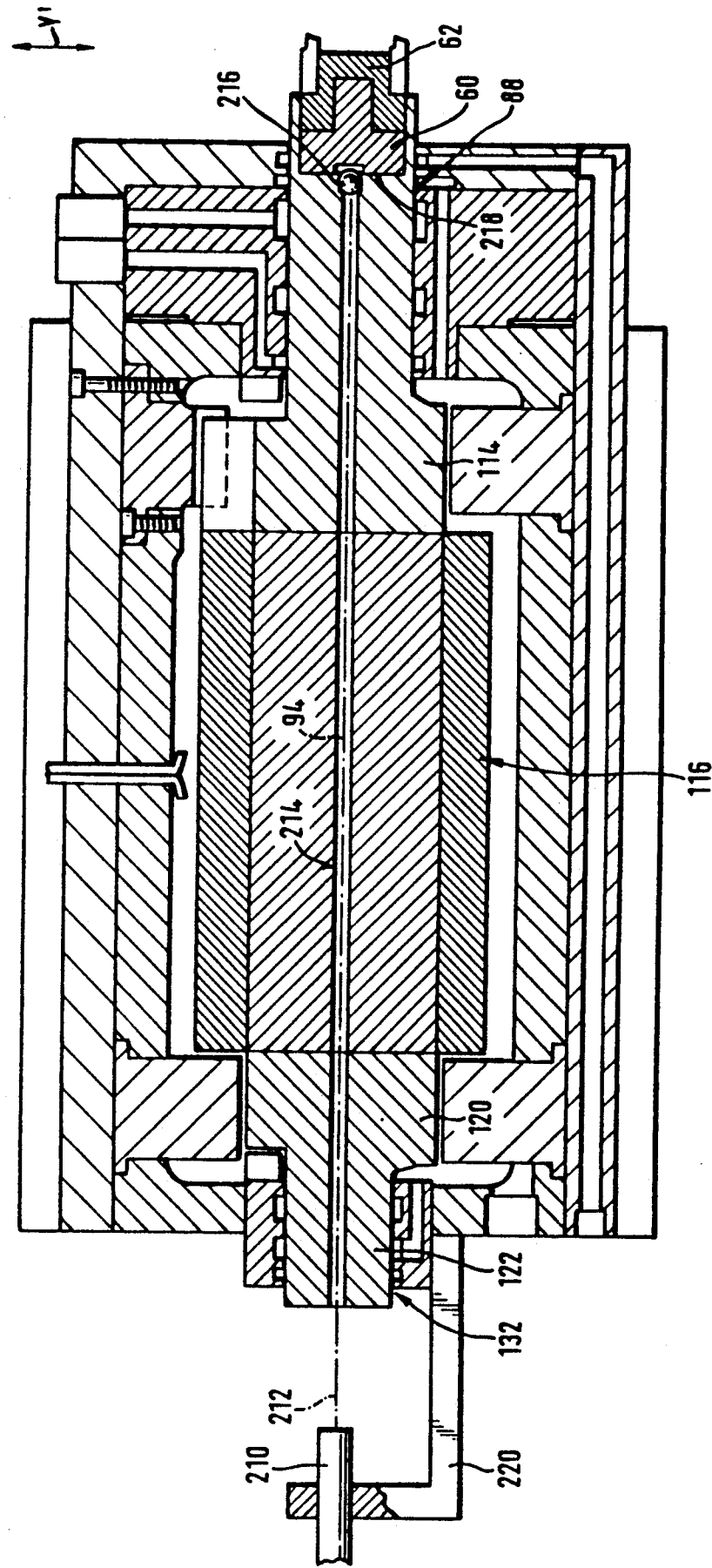
Figure 10:
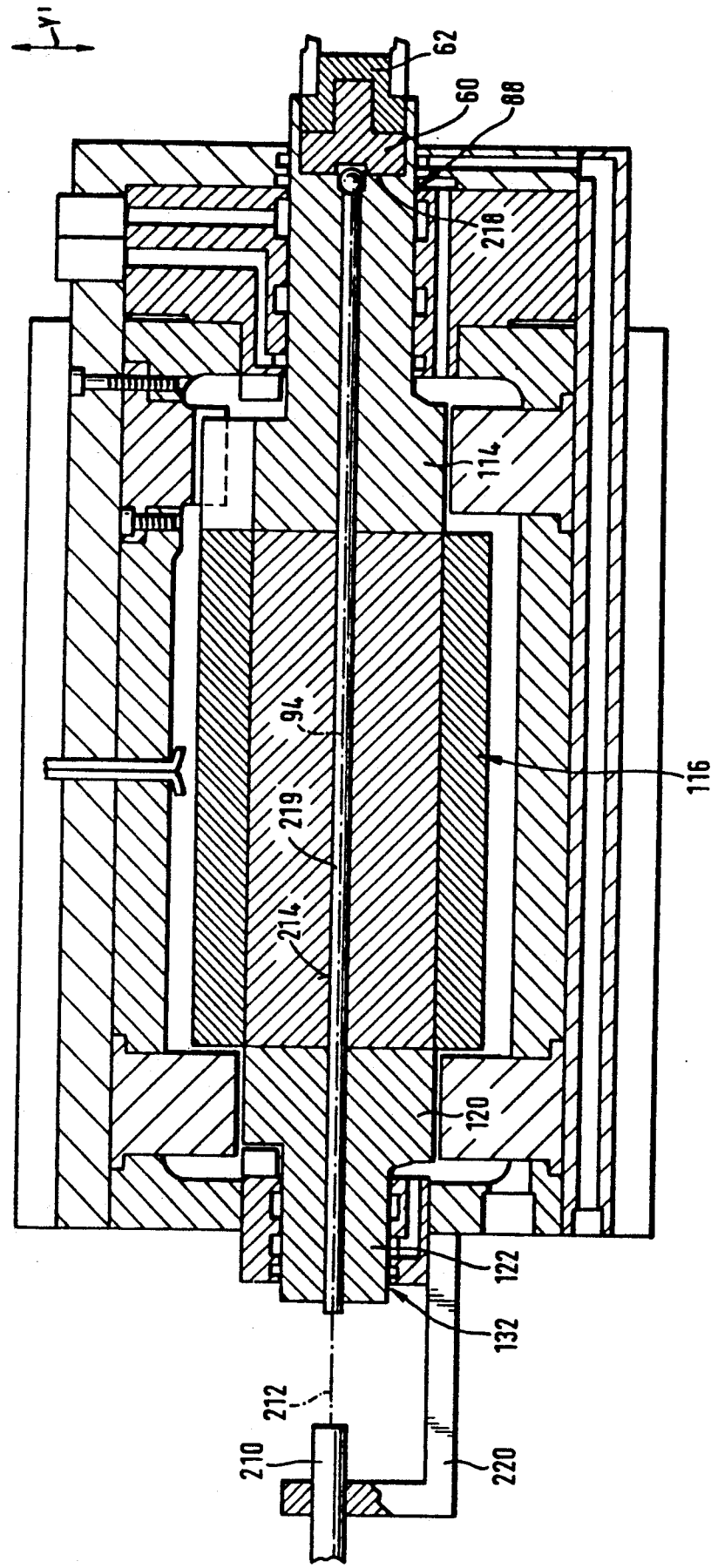
Figure 11:
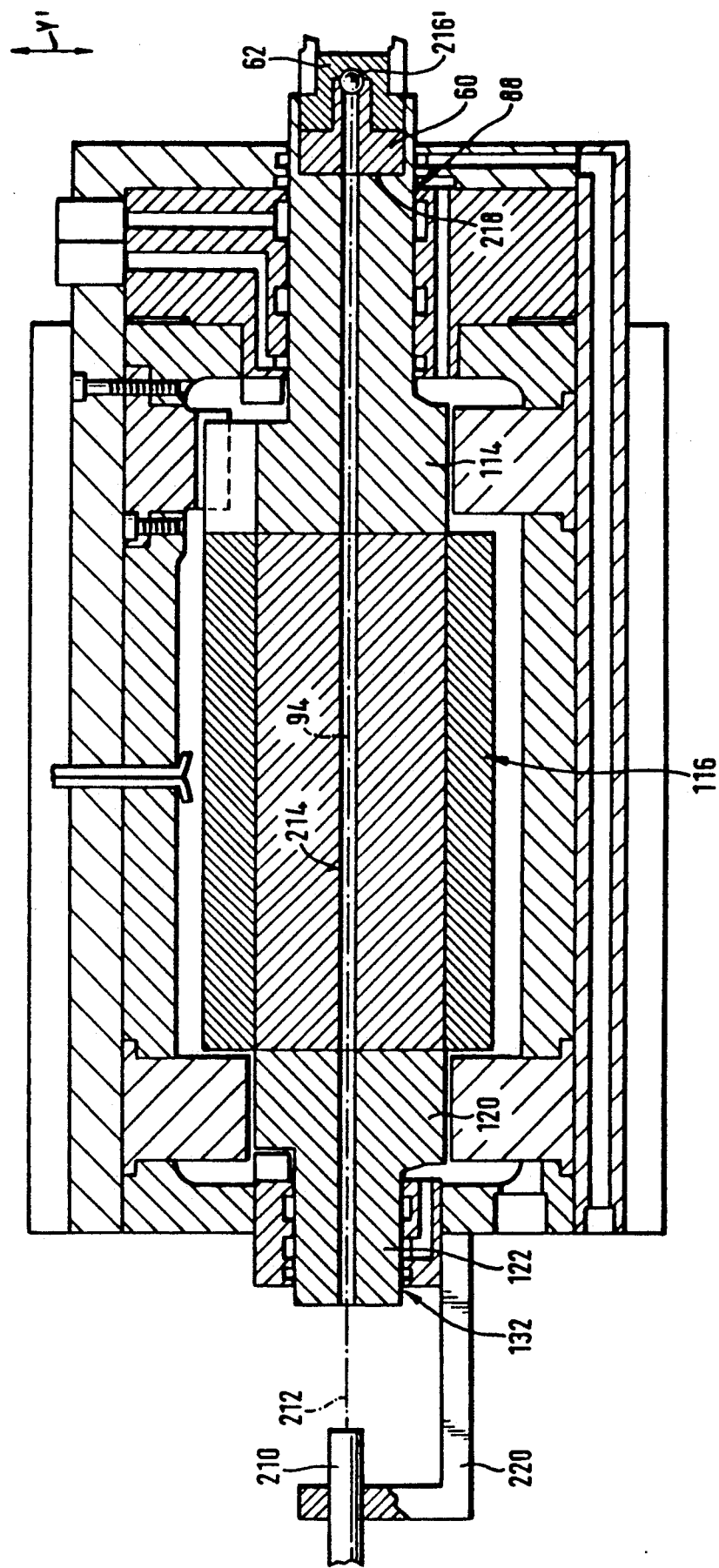
Figure 12:
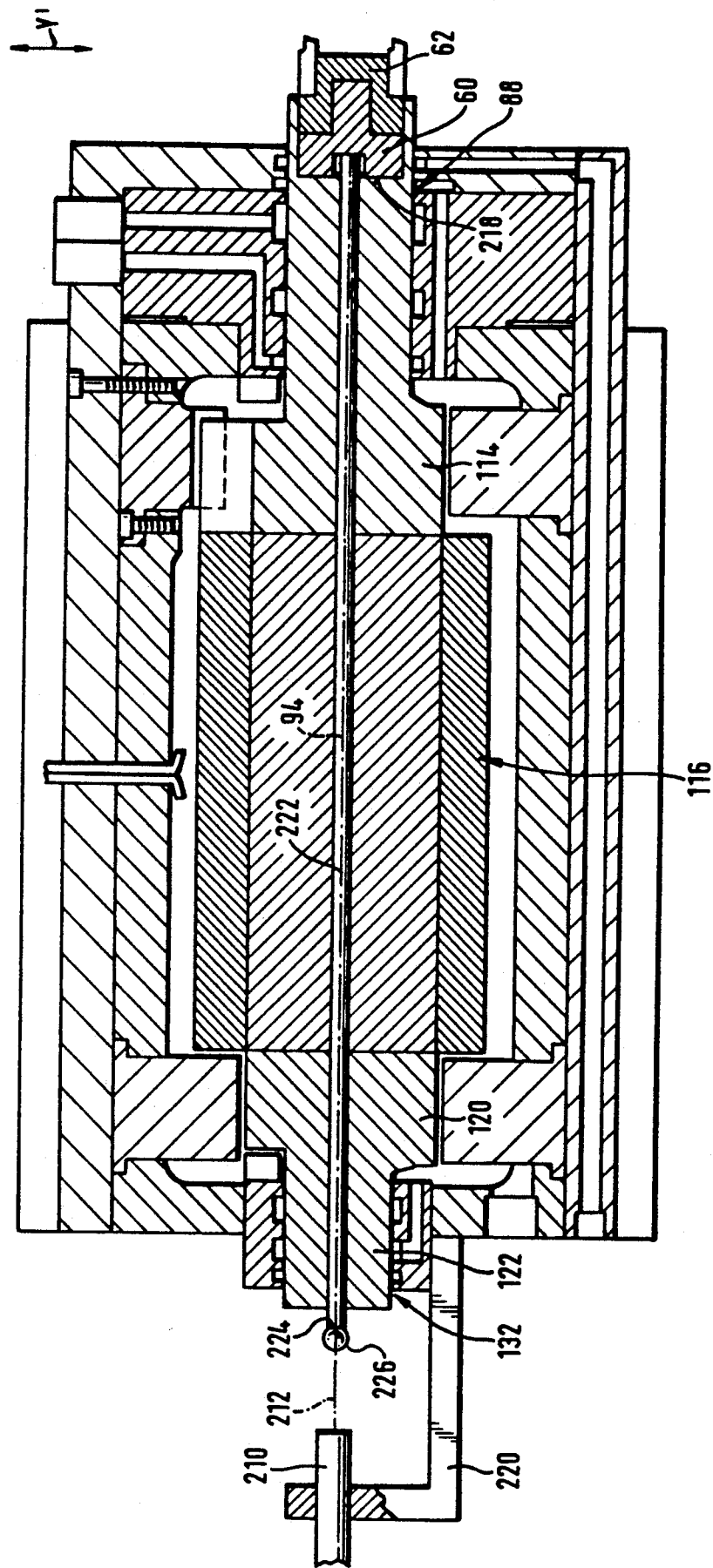
Figure 13:
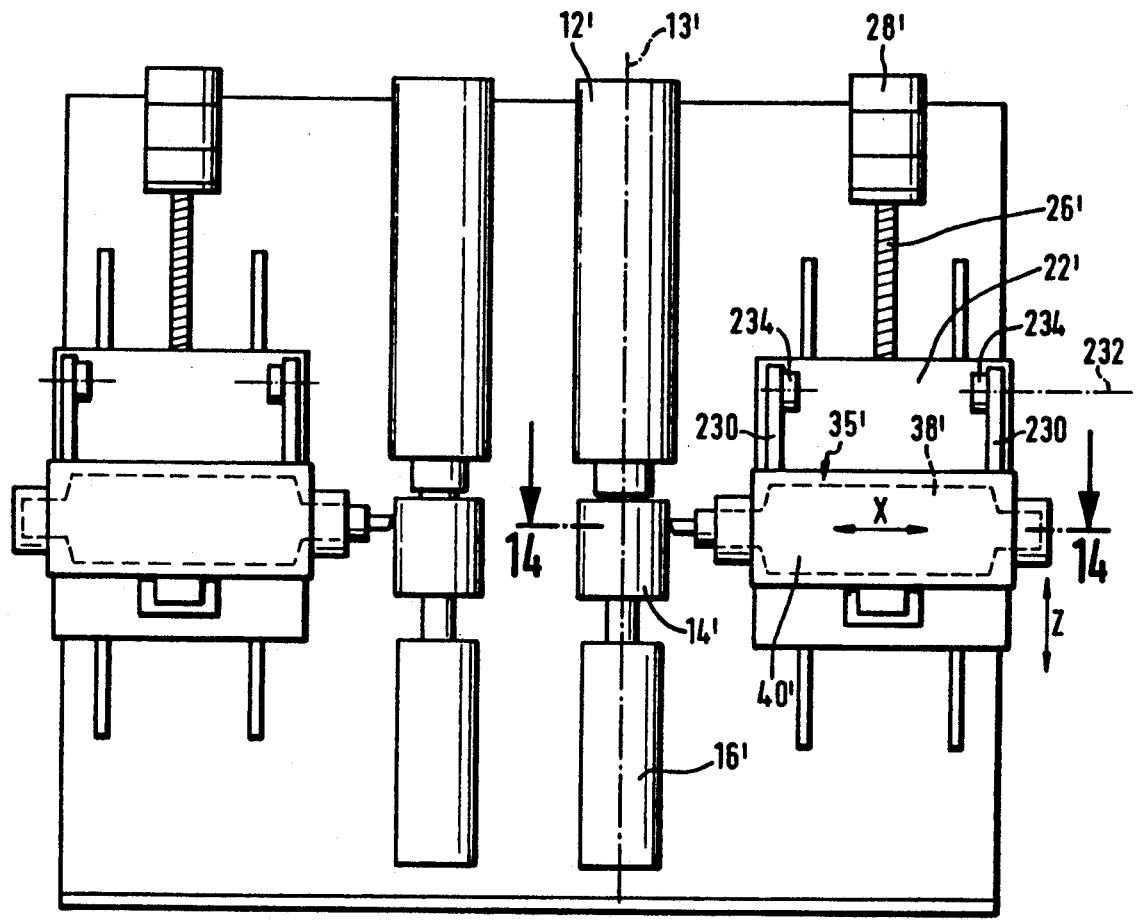
Figure 14:
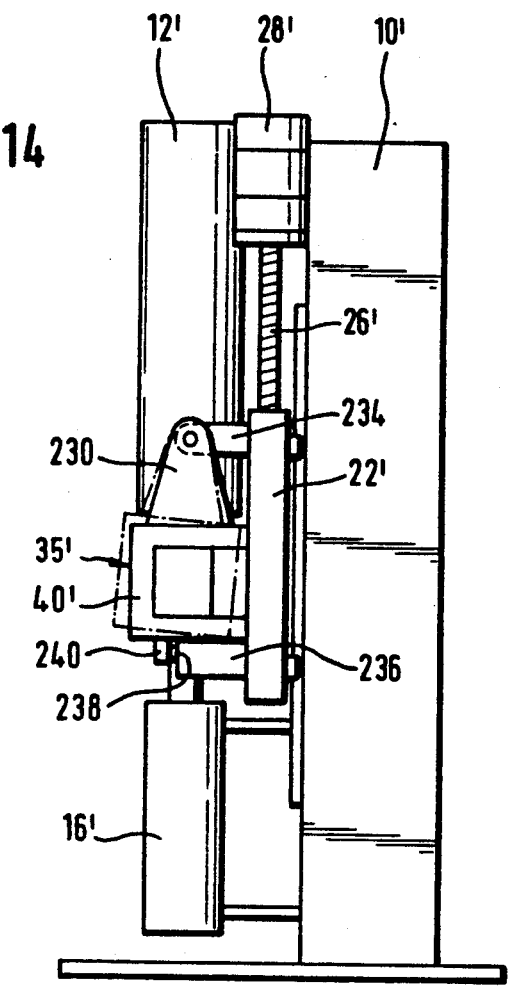

Further features and advantages of the inventive solution are set forth in the following description and the appended drawings of several embodiments. The drawings show:

FIG. 1 a side view of a first embodiment;

FIG. 2 a plan view along Line 2—2 of the first embodiment;

FIG. 3 a section through the first embodiment along line 3—3 in FIG. 2;

FIG. 4 a horizontal section through an X-axis drive of the first embodiment;

FIG. 5 a vertical section through the X-axis drive;

FIG. 6 a section along line 6—6 in FIG. 5;

FIG. 7 a section along line 7—7 in FIG. 5;

FIG. 8 a schematic illustration of a control device of the first embodiment;

FIG. 9 a section similar to FIG. 5 through a second embodiment;

FIG. 10 a section similar to FIG. 5 through a variant of the second embodiment;

FIG. 11 a section similar to FIG. 5 through a variant of the second embodiment;

FIG. 12 a section similar to FIG. 5 through a further variant of the second embodiment;

FIG. 13 a third embodiment;

FIG. 14 a side view of the third embodiment in FIG. 12; and

Figure 15:
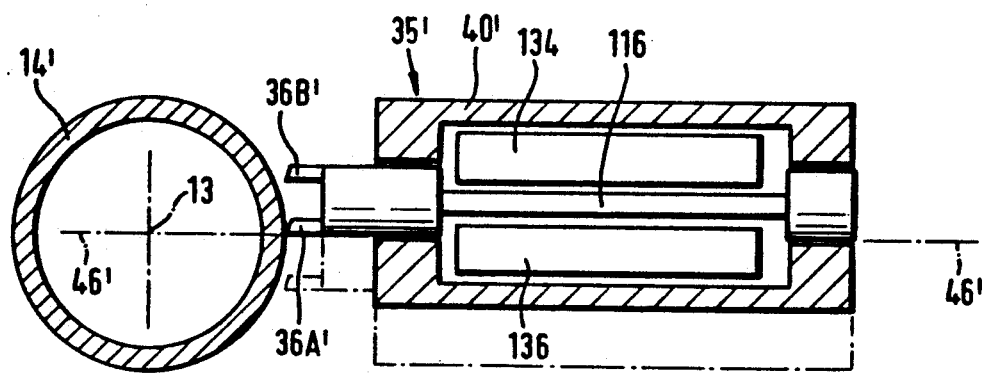

FIG. 15 a section along line 15—15 in FIG. 13.

A first embodiment of an inventive device for the non-circular machining of pistons comprises, as illustrated in FIGS. 1 to 3, a machine frame designated in its entirety 10 on which a spindle 12 with an essentially horizontal spindle axis 13 is held. A piston 14 is clampable in the spindle 12 for turning. The piston 14 is held opposite the spindle 12 by a rotating clamping sleeve 16 likewise arranged on the machine frame 10 coaxially with the spindle 12. The spindle 12 is preferably driven via a driving belt 18 by a spindle motor 20 seated on the machine frame 10.

The spindle 12 and the clamping sleeve 16 are held stationarily on the machine frame 10 and the clamping sleeve 16 is hydraulically actuatable for clamping the piston 14.

For machining the piston 14 there is provided on the machine frame 10 a Z-slide 22 which is mounted on Z-guides 24 for displacement in the Z-direction parallel to the spindle axis 13. The Z-slide 22 is adjustable in a defined manner in the Z-direction by a ball-race spindle 26 driven by a Z-axis drive 28.

A Z-axis sensor 30 is provided for determining the position of the Z-slide 22 relative to the machine frame 10. The Z-axis sensor 30 preferably comprises a linear scale 34 which is optically scannable by a scanning unit 32.

On the Z-slide 22 there is provided an X-axis drive 35 comprising a tool carrier 38 in the form of a linear motor displaceable in an X-direction perpendicular to the Z-direction and hence perpendicular to the spindle axis 13 and preferably extending horizontally, and a linear displacement device 40 by means of which the tool carrier 38 is positionable in a controlled manner in the X-direction.

The tool carrier 38 displaceable in the X-direction carries—as described in detail hereinbelow—two tools 36A and 36B advanceable in the X-direction towards the piston 14. The entire arrangement of the tool carrier 38 with the linear displacement device 40 is described in detail hereinbelow. The tools 36A and 36B advanceable in the X-direction towards the piston 14 are for non-circular machining of the piston.

To enable the two tools 36A and 36B to be alternately brought into use, the linear displacement device 40 is movable in a tool changing direction 43 on displacement guides 44 between two stops 41 and 42 in the form of stop bars defining two stop positions. For this purpose, a drive 45 is provided for acting upon the linear displacement device 40 such that it rests either against the stop 41 in which case the piston 14 is machined with tool 36A or against the stop 42 in which case the piston 14 is machined with tool 36B.

The stops 41 and 42 are arranged such that the cutters of the tools 36A and 36B lie in the same cutting plane 46, preferably extending through the spindle axis 13, when the tools 36A and 36B are standing in their machining position.

For also machining piston ring grooves in the piston 14 in the same clamping thereof, there is provided, as illustrated in FIGS. 1 and 3, in a Y'-direction standing perpendicular on the X-direction and the Z-direction and on the spindle axis 13, a Y'-tool 47 which is held on a Y'-slide 48 mounted, for its part, for displacement on a Z'-slide 49 and positionable in the Y'-direction by a Y'-axis drive 50.

The Z'-slide 49, for its part, is mounted on the machine frame 10 for displacement in the Z'-direction extending parallel to the Z-direction and to the spindle axis 13 and is adjustable by a Z'-axis drive 51 in the Z'-direction. The Z'-slide is preferably arranged on that side of the piston 14 on which the spindle 12 lies and is seated above the spindle 12, and the Z'-axis drive 51 is seated on the side of the spindle motor 20 opposite the spindle 12.

For controlling the tool carrier 38 there is provided a control device designated in its entirety 52 which activates via the Z-axis sensor 30 the Z-axis drive 28 and hence the Z-slide 22 and activates the spindle 12 via the spindle motor 20 as rotational-angle-controlled C-axis, for which purpose there is provided coaxially with the spindle 12 and connected, to the latter a rotational angle sensor 54 as C-axis sensor. Furthermore, the advance of the tool carrier 38 carrying the X-tools 36A, B is controlled via the linear displacement device 40, and an X-axis sensor 56 which determines the movements of the tool carrier 38 relative to the Z-slide 22 is provided for determining the movements of the tool carrier 38 in the X-direction.

The inventive device for the non-circular machining of pistons is, furthermore, preferably constructed symmetrically in relation to a center plane 58 and allows two pistons 14 to be machined simultaneously, with all of the above-mentioned parts except for the Z'-axis drive 50 and Z'-slide 46 being provided twice.

The linear displacement device 40 with the tool carrier 38, illustrated on an enlarged scale in FIGS. 4 and 5, comprises a tool holder receiving means 60 in which a tool holder 62 can be inserted and placed against a gauged stop surface 61 of the tool holder receiving means 60. The tool holder 62 carries two tools 36A and 36B arranged one above the other in the Y'-direction. This tool holder 62 comprises a central bore 68 in which a centering pin 70 of the tool holder receiving means 60 is introducible. For clamping the tool holder 62, the central bore 68 is additionally provided with an annular groove 72 in which clamping wedges 76 of the tool holder receiving means 60 extending radially in relation to a pin axis 74 engage in order to clamp the tool holder 62 and position it against the gauged stop surface 61. Furthermore, the tool holder 62 is surrounded on its outer side 78 facing the tool holder receiving means 60 by cylinder-segmentlike enclosure members 80 of the tool holder receiving means 60.

The tool holder receiving means 60 is located immediately in front of a front cylindrical guiding body 82 of the tool carrier 38 which together with a front bearing brass 86 held on a housing 84 forms a front sliding bearing designated in its entirety 88.

This front sliding bearing 88 is in the form of a hydrostatic bearing and comprises, as illustrated in FIGS. 4, 5 and 6, a bearing ring 90 receiving the cylindrical, front guiding body 82 serving as sliding piece, with a cylinder axis 83 of the front guiding body 82 as guide and of the bearing ring 90 coinciding with a longitudinal axis 94 of the tool carrier 38.

The bearing ring 90 comprises, as illustrated in FIGS. 4, 5 and 6, front pressure pockets 96 arranged at an angular spacing from one another and extending over an angular area. These are each acted upon via a pressure line 98 of their own by pressure medium. There are also arranged in the bearing ring 90 at a spacing from the front pressure pockets 96 rear pressure pockets 100 which are each likewise acted upon via a pressure line 102 of their own by pressure medium. Between the front pressure pockets 96 and the rear pressure pockets 100 there is provided a collecting groove 104 in the bearing ring 90 which extends around the cylindrical, front guiding body 82 and is connected to a return flow bore 106 which extends from an outer circumferential surface 108 of the front guiding body 82 into the latter and opens into a return flow channel 110 extending in the front guiding body 82 parallel to the longitudinal axis 94 of the latter. This return flow channel 110 exits from the front guiding body 82 at a rear end face 112 facing away from the tool holder receiving means 60.

Adjoining the side of the front guiding body 82 opposite the tool holder receiving means 60 is a front intermediate piece 114 on which there is held on the side thereof opposite the front guiding body 82 a secondary part 116 of a linear motor designated in its entirety 118. This secondary part 116 is, in turn, held at its side opposite the front intermediate piece 114 on a rear intermediate piece 120. Adjoining the intermediate piece 120 is a rear guiding body 122 serving as sliding piece. The guiding body 122 is similarly of cylindrical shape coaxial with the longitudinal axis 94 and is held in a rear bearing brass 124 which, for its part, is provided with a bearing ring 126 surrounding the rear guiding body 122 serving as guide. The bearing ring 126 is likewise provided with four pressure pockets 128 arranged at an angular spacing and similarly extending over an angular area. The pressure pockets 128 are each acted upon via pressure lines 130 of their own by pressure medium.

Hence the pressure pockets 128 together with the bearing ring 126 and the rear guiding body 122 altogether form a rear sliding bearing 132.

Each single one of the pressure lines 98, 102 and 130 and hence each single one of the pressure pockets 96, 100 and 128 is supplied via a regulator of its own 99, 103 and 131 which regulates the flow through the pocket in accordance with the pocket pressure such that when the pocket pressure increases, there is a linear increase in the flow through the pocket.

The tool carrier 38 thus includes the rear bearing body 122, the intermediate piece 120, integrates the secondary part 116 of the linear motor 118, then continues in the intermediate piece 22 and the front guiding body 82 as far as the tool holder receiving means 60 and also comprises the exchangeable tool holder 62. The tool carrier 38 is guided by the front sliding bearing 88 and the rear sliding bearing 132, in particular their bearing brasses 86 and 124, on the housing 84.

This housing 84 also receives primary parts 134 and 136 of the linear motor 118. The primary part 134 and the primary part 136 enclose the secondary part 116 between them. The secondary part 116 comprises opposed surfaces which face the primary parts 134 and 136 and between which there lies parallel to these a center plane 138 which preferably stands perpendicular on the cutting plane 46. The two primary parts 134 and 136 extend essentially over the total distance between the sliding bearings 88 and 132 and engage in directions parallel to the center plane 138 over the secondary part 116, preferably between its bearing brasses 86 and 124, so that the intermediate pieces 120 which do not belong to the secondary part 116 extend in between the primary parts 134 and 136 and preferably have perpendicular to the center plane 138 lying between the primary parts 134 and 136 the same thickness as the secondary part 116.

To secure the tool carrier 38 against rotation and support the torque thereof, the front intermediate piece 114 is provided with a wedge 140 extending symmetrically in relation to the center plane 138 lying between the two primary parts 134 and 136. The wedge 140 likewise lies between the primary parts 134 and 136 and extends in a wedge groove 142 which is machined in a nose 144 projecting between the primary parts 134 and 136. The nose 144 is part of a filler piece 146 which, for its part, is held on the housing 84.

Both wedge surfaces 148 of the wedge 140 are provided with oil pockets 150, 151. Arranged opposite these are openings 152, 153 of pressure conduits 154, 155 which are led through the filler piece 146 and the nose 144 and through which pressure medium is introduced into the oil pockets 150, 151 so that the wedge 140 is guided free of play symmetrically in relation to the center plane 138 in the wedge groove 142.

Each of the pressure conduits 154 and 155 is provided with a regulator of its own 157, 159 which controls the pressure in and the flow through the oil pockets 150, 151 in such a way that when the pressure increases, there is a linear increase in the flow through the pockets.

Hence the tool carrier 38 is, on the one hand, guided in the sliding bearings 88 and 132 for receiving forces acting through the tools 36A or 36B transversely to the longitudinal axis 94, with the sliding bearing 88 receiving the largest of such forces, and, on the other hand, it is also secured against rotations about the longitudinal axis 94 by a rotation preventing means 156 formed by the wedge 140 and the wedge groove 142.

The linear motor 118 is preferably in the form of a three-phase asynchronous linear motor, preferably a double-comb-type linear motor in which the two primary parts 134 and 136 are each comprised of an iron core 160 comprising grooves 162 facing the secondary part 116 and extending parallel to the center plane 138 tool transversely over the entire width of the secondary part 116. The exciting windings 164 lie in the grooves 162.

The secondary part 116 is, furthermore, provided with short circuit windings which comprise outer copper rods 166 and 168 extending on both sides of the secondary part 116 and parallel to the longitudinal axis 94 over the entire length of the secondary part 116. The copper rods 166 and 168 lie symmetrical in relation to the center plane 138 and extend over the entire thickness of the secondary part 116 perpendicular to the center plane 138. These outer copper rods 166 and 168 are electrically conductively connected by copper rods 170 and 172 extending parallel to the grooves 162 and hence parallel to the center plane 138 and perpendicular to the longitudinal axis 94. The copper rods 170 and 172 are each arranged in planes lying parallel to the center plane 138 such that with their outer circumferential surface 174 they reach as far as the respective surface 176 and 178, respectively, of the secondary part 116, but are spaced from one another perpendicular to the center plane 138. Furthermore, the copper rods 170 and 172 are spaced at a constant distance from one another in the longitudinal direction of the secondary part 116, i.e., in the direction parallel to the longitudinal axis 94, and this distance preferably corresponds to the distance between the grooves 162 in the primary parts 134 and 136.

The outer copper rods 166 and 168 and the copper rods 170 and 172 are preferably held on a carrier body 180 of the secondary part 116 which forms an iron core. The carrier body 180 itself has the same thickness as the outer copper rods 166 and 168 perpendicular to the center plane 138 and extends between these. This carrier body 180 is provided with bores 182 in which the copper rods 170 and 172 lie.

To avoid deformations of the secondary part 116 by non-uniform temperature within the latter, a tempering means 184 is provided for it. This advantageously comprises oil showers 186, 188 which are arranged above the secondary part 116 and shower the latter with oil which runs off over the secondary part 116 into a pan 190 located below the secondary part 116. In order for this to take place as uniformly as possible, the oil showers 186 and 188 are arranged approximately at the center of the secondary part 116 and distribute the oil in opposite directions parallel to the longitudinal axis 94 of the secondary part 116. The shower jets 192 and 194 thereof strike the top copper rod 168.

The oil used for the hydrostatic sliding bearings 88 and 132 is preferably used as oil for the oil shower so that the oil running out of these sliding bearings 88, 132 can be conducted in a simple way into the pan 190, for example, via the return flow conduit 110 and starting from there can be used again. The oil return flow conduit 196 discharging into the oil pan 190 serves this purpose.

The three-phase asynchronous linear motor 118 operates such that there is generated by the exciting windings 164 a field which in the plane formed by the copper rods 170 parallel to the center plane 138 allows circular currents to develop owing to several electrically conductive connections with the outer copper rods 166 and 168 and also in the plane formed by the copper rods 172 owing to their electrical connection with the outer copper rods 166 and 168. These circular currents, for their part, contribute to a magnetic field which interacts with the field generated by the exciting windings 164 and hence leads to displacement movement of the tool carrier 38 in the X-direction.

For activating the three-phase asynchronous linear motor 118, the control device 52 comprises, as illustrated schematically in FIG. 8, an X-axis computer 197 which acquires the Iz value measured by the Z-axis sensor 30, the Ix value measured by the X-axis sensor 56 and the Ic value measured by the C-axis sensor 54. With these values, the X-axis computer 197 calculates on the basis of stored set values directly set current values Su, Sv, Sw which a converter 198 using three-phase current with the phases R, S, T from the mains converts into three-phase current with the individual currents iu, iv and iw with which the exciting windings 164 of the primary parts 134 and 136 are then powered.

Furthermore, the independently operating X-axis computer 197 is activated by a superordinate machine control means 199 for monitoring the entire control device 52.

Further details relating to the features, activation and function of such an asynchronous linear motor are disclosed at length in the magazine "Werkstattstechnik" (Workshop Technology) 79 (1989), pages 647 to 650, to the contents of which reference is made in full.

For determining the displacement of the tool carrier 38 relative to the Z-slide 22, the X-axis sensor 56 is held—as illustrated in FIG. 4—on the housing 84 which, for its part, is mounted on the Z-slide 22 for non-displacement in the X-direction. The X-axis sensor 56 is mounted with a stationary part 200 on the front bearing brass 86, while a movable part 202 of the same is fixedly connected to a stiffened arm 204 which, for its part, is held on a ring 206 surrounding the enclosure members 80 of the tool holder receiving means 60 and connected to the latter. Hence a point of application for measurements of the arm 204 directly engages the tool holder receiving means 60 and thus in the immediate vicinity of the tool holder 62 so as to eliminate any changes in length of the other parts of the tool carrier 38.

The X-axis sensor 56 is preferably an optical length sensor, with the movable part 202 being an optically readable linear scale.

In a second embodiment, illustrated in FIG. 9, a laser interferometer is used as X-axis sensor 56. This comprises a measuring head 210 arranged coaxially with the longitudinal axis 94 behind the rear sliding bearing 132. This measuring head 210 comprises a laser emitting a laser beam 212, and the measuring head 210 is arranged such that the laser beam 212 leaves it coaxially with the longitudinal axis 94 in the direction of the rear guiding body 122. The rear guiding body 122 and the intermediate piece 120, the carrier body 180 of the secondary part 116, the intermediate piece 114 and the front guiding body 82 are provided with a bore 214 which extends coaxially with the longitudinal axis 94 and forms a channel for the laser beam 212 so that it penetrates all these parts and strikes a reflector 216 which reflects the laser beam likewise coaxially with the longitudinal axis 94 back to the measuring head 210. The reflector 216 is preferably fixedly connected to the tool holder receiving means 60 at an end 218 of the tool holder receiving means 60 facing the front guiding body 82 and so the point of application for measurements of the laser interferometer is also located at this end 218. In the simplest case, the reflector 216 is a ball.

The second embodiment can be further modified by inserting in the bore 214 a light guide 219 which extends from the reflector 216 as far as at least the rear guiding body 122 and hence eliminates the influences of varying pressure and varying temperature in the bore 214. The reflector 216 is expediently seated at the end of the light guide 219 facing the latter.

As an alternative to this, in order to obtain a more precise measurement, provision is made in a further variant of the second embodiment illustrated in FIG. 11 for the reflector 216' to be arranged directly on the tool holder 62 so that the point of application for measurements lies on the tool holder 62 itself.

Owing to the fact that the measuring head 210 is connected, for example, via a holding angle 220 fixedly to the housing 84 and hence also to the Z-slide 22, the measuring head 210 of the laser interferometer is capable of exactly determining a distance between a fixed point in the X-direction on the Z-slide 22 and the reflector 196 and 196', and, advantageously, all expansions in length of the tool carrier 38 do not affect the measurement accuracy, but instead either the exact position of the tool holder receiving means 60 or also of the tool holder 62 in the X-direction is determined.

In a further variant of the X-axis sensor 56, illustrated in FIG. 12, a rod 222 of a material with negligible expansion in length, for example, an invar or glass rod, serving as intermediate element, engages the tool holder receiving means 60. The rod 222 lies in the bore 214 and extends through the front guiding body 82, the intermediate piece 114, the carrier body 180 of the secondary part 116, the intermediate piece 120 and the guiding body 122 and protrudes beyond the latter on its rear side. At its rear end 224, this rod 222 carries the reflector 226 so that the measuring head 210 of the laser interferometer detects the distance between a position fixed on the Z-slide 22 in the X-direction and the reflector 226, with the position of the reflector 226 varying in accordance with the position of the tool holder receiving means 60 owing to the rod 222 which is invariable in length. In this variant, the rod 222 is fixedly connected to the tool holder receiving means 60 and in order to permit an expansion in length diverging from the tool carrier 38 lies freely displaceable in the bore 214.

In a further variant, provision is made to lead the rod 222 through as far as the tool holder 62 through the tool holder receiving means 60 so that the reflector 216 represents the exact position of the tool holder 62.

The laser interferometer comprising measuring head 210 and reflector 216 or 226 is preferably a laser interferometer of Hommel-Werke in accordance with German patent 36 30 887.

In a third embodiment of the inventive device, illustrated in FIGS. 13 to 15, those parts which are identical with those of the first embodiment have the same reference numerals and so reference is to be had in full in this connection to the statements on the first embodiment. For purposes of distinction, a prime mark has merely been added to the reference numerals.

The third embodiment shows, exactly as the first embodiment, a machine frame 10' on which the spindle 12' is arranged, but with the spindle axis 13' extending in the vertical direction. The clamping sleeve 16' is arranged underneath the spindle 12' coaxially with its spindle axis 13'. The piston 14' is clampable for the noncircular machining between the clamping sleeve 16' and the spindle 12'.

Furthermore, the Z-slide 22' is mounted on the machine frame 10' for displacement by the Z-axis drive 28' and the ball-race spindle 26'. In this case, the Z-direction is, as before, oriented parallel to the spindle axis 13' and hence likewise extends in the vertical direction. Seated on the Z-slide 22' is the linear displacement device 40' with the tool carrier 38' which is displaceable in the X-direction which is perpendicular to the spindle axis 13' and now extends horizontally.

The linear displacement device 40' can be swivelled in its entirety by two swivel levers 230 about a swivel axis 232 on bearing arms 234 of the Z-slide 22' into two positions illustrated either in continuous or dot-and-dash lines in FIGS. 13 and 14. In the illustration shown in continuous lines in FIGS. 13 and 14, the tool 36A' is in a machining position for the piston 14', while in the position drawn in dot-and-dash lines the tool 36B' is in the machining position for the piston 14'.

To swivel the linear displacement device 40' into the two positions, there is provided a swivel drive device 236 which is arranged on the side of the linear displacement device 40' opposite the swivel axis 232 and acts with a movable member 238 on an arm 240 which is fixedly connected to the linear displacement device 40'. The linear displacement device 40' can thereby be swivelled about the swivel axis 232 into the two positions described hereinabove.

Owing to the vertical arrangement of the spindle axis 13', the cutting plane 46' for the tools 36A' and 36B' is also vertical. In this embodiment, in contrast with the first embodiment, the secondary part 116' stands with its center plane 138' parallel to the cutting plane 46'.

In other respects the third embodiment of the inventive device operates in the same way as the first embodiment.

The present disclosure relates to the subject matter disclosed in German Application No. P 40 31 091.4 of Oct. 2, 1990, the specification of which is incorporated herein by reference.

What is claimed is:

1. A device for the non-circular machining of workpieces comprising:
    a machine frame;
    a workpiece spindle held on said machine frame and rotatable about a C-axis for a workpiece to be machined;
    a Z-slide displaceable on said machine frame in a Z-direction in relation to said workpiece spindle and having a Z-axis drive, said Z-direction being generally parallel to said C-axis;
    an X-axis drive in the form of a linear motor arranged on said Z-slide for advancing a tool carrier bearing a tool in an X-direction towards said workpiece, said X-direction being generally transverse to said C-axis; and
    a numerical control system for activating said X-axis drive in correlation with a rotation of said workpiece spindle;
    said linear motor serving as the X-axis drive being a three-phase asynchronous linear motor designed as a double-comb-type linear motor with two opposed primary parts, at least one of said primary parts fixedly arranged in said X-direction on said Z-slide and said primary parts enclosing a secondary part between them;
    said secondary part being movable relative to said primary parts and carrying said tool; and
    said secondary part being guided with hydrostatic sliding bearings spaced from one another along said secondary part in said X-direction.

2. A device as defined in claim 1 wherein said primary parts project beyond said secondary part in said X-direction.

3. A device as defined in claim 1 wherein said primary parts project beyond said secondary part in a direction transverse to said X-direction.

4. A device as defined in claim 1 wherein said secondary part extends in a cantilever manner between said bearings.

5. A device as defined in claim 1 wherein said secondary part forms a carrying section of said tool carrier.

6. A device as defined in claim 5, wherein a longitudinal section of said tool carrier is formed exclusively by said secondary part.

7. A device as defined in claim 1 wherein said secondary part is kept at a constant temperature.

8. A device as defined in claim 7, wherein said secondary part is kept at a constant temperature by oil being flushed around it.

9. A device as defined in claim 1 wherein said bearings for said secondary part also serve as bearings for guiding said tool carrier in said X-direction.

10. A device as defined in claim 1 wherein said tool is arranged on said tool carrier pointing away from said secondary part.

11. A device as defined in claim 1 wherein said tool is seated in an exchangeable tool holder.

12. A device as defined in claim 11, wherein said tool carrier comprises a gauged stop surface for the exact positioning of said tool holder.

13. A device as defined in claim 1 wherein said secondary part comprises an iron core with inserted short circuit windings.

14. A device as defined in claim 13, wherein said short circuit windings lie in two planes facing said primary parts.

15. A device as defined in claim 14, wherein a channel for said X-axis sensor runs through the secondary part between said planes.

16. A device as defined in claim 1 wherein said three-phase asynchronous linear motor is positionally controlled by flux-oriented current conduction.

17. A device as defined in claim 16, 1 wherein said three-phase asynchronous linear motor is controlled by a computer which calculates set three-phase values for said linear motor and transmits them to a converter which converts three-phase current from a source in accordance with said set three-phase values.

18. A device as defined in claim 1 wherein several tools are provided which are spaced from one another in a direction perpendicular to said X- and Z-directions.

19. A device as defined in claim 18, wherein said X-axis drive is displaceable relative to said Z-slide in a tool-changing direction extending perpendicular to said Z-direction and said X-direction.

20. A device as defined in claim 19, wherein said X-axis drive is displaceable between two stop positions.

21. A device as defined in claim 20, wherein said stop positions are placed such that in each stop position one of said tools of said tool carrier stands in the same cutting plane.

22. A device as defined in claim 18, wherein one of said tools is provided for rough machining and another tool is provided for finishing.

23. A device as defined in claim 1 wherein a Z'-slide is provided for carrying a Y'-axis drive with which a tool carrier can be advanced with a tool in the Y'-direction towards said workpiece.

24. A device as defined in claim 1, wherein said hydrostatic sliding bearings comprise guides arranged stationarily in said X-direction on said Z-slide and sliding pieces displaceable in said guides and connected to said secondary part.

25. A device as defined in claim 24, wherein longitudinal sections of said tool carrier are formed exclusively by said sliding pieces.

26. A device as defined in claim 24, wherein said hydrostatic sliding bearings comprise pressure pockets which are acted upon by oil under pressure.

27. A device as defined in claim 26, wherein an oil supplying device is provided for controlling the oil pressure in said pressure pockets such that when the oil pressure increases, the amount of oil flowing through said pressure pockets also increases.

28. A device as defined in claim 27, wherein at least one bearing of said secondary part comprises a torque supporting means.

29. A device as defined in claim 28, wherein said torque supporting means comprise hydrostatically supported guiding surfaces.

30. A device as defined in claim 29, wherein said guiding surfaces are hydrostatically supported wedge surfaces.

31. A device as defined in claim 29, wherein said torque supporting means are associated with a bearing located between said secondary part and said tool.

32. A device as defined in claim 26 wherein the oil used for said hydrostatic sliding bearings simultaneously serves for tempering said secondary part.

33. A device for the non-circular machining of workpieces comprising:
- a machine frame;
- a workpiece spindle held on said machine frame and rotatable about a C-axis for a workpiece to be machined;
- a Z-slide displaceable on said machine frame in a Z-direction in relation to said workpiece spindle and having a Z-axis drive, said Z-direction being generally parallel to said C-axis;
- an X-axis drive in the form of a linear motor arranged on said Z-slide for advancing a tool in an X-direction generally transverse to said C-axis towards said workpiece, said linear motor having a primary part and a secondary part movable with respect to one another,
- said secondary part being kept at a constant temperature by oil showers arranged above said secondary part and distributing oil essentially uniformly on said secondary part; and
- a numerical control system for activating said X-axis drive in correlation with a rotation of said workpiece spindle.

34. A device for the non-circular machining of workpieces comprising:
- a machine frame;
- a workpiece spindle held on said machine frame and rotatable about a C-axis for a workpiece to be machined;
- a Z-slide displaceable on said machine frame in a Z-direction in relation to said workpiece spindle and having a Z-axis drive, said Z-direction being generally parallel to said C-axis;
- an X-axis drive in the form of a linear motor arranged on said Z-slide for advancing a tool in an X-direction generally transverse to said C-axis towards said workpiece, said linear motor having a primary part and a secondary part movable with respect to one another,
- said secondary part being guided by hydrostatic sliding bearings using oil and being kept at a constant temperature by said oil being flushed there around; and
- a numerical control system for activating said X-axis drive in correlation with a rotation of said workpiece spindle.

35. A device as defined in claim 34, wherein said bearings for said secondary part also serve as bearings for guiding said tool carrier in said X-direction.

36. A device as defined in claim 34, wherein said hydrostatic sliding bearings comprise guides arranged stationarily in said X-direction on said Z-slide and sliding pieces displaceable in said guides and connected to said secondary part.

37. A device as defined in claim 36, wherein longitudinal sections of said tool carrier are formed exclusively by said sliding pieces.

38. A device as defined in claim 36, wherein said hydrostatic sliding bearings comprise pressure pockets which are acted upon by oil under pressure.

39. A device as defined in claim 38, wherein an oil supplying device is provided for controlling the oil pressure in said pressure pockets such that when the oil pressure increases, the amount of oil flowing through said pressure pockets also increases.

40. A device as defined in claim 34, wherein at least one bearing of said secondary part comprises a torque supporting means.

41. A device as defined in claim 40, wherein said torque supporting means comprise hydrostatically supporting guiding surfaces.

42. A device as defined in claim 41, wherein said guiding surfaces are hydrostatically supported wedge surfaces.

43. A device as defined in claim 40, wherein said torque supporting means are associated with a bearing located between said secondary part and said tool.

44. A device for the non-circular machining of workpieces comprising:
- a machine frame;
- a workpiece spindle held on said machine frame and rotatable about a C-axis for a workpiece to be machined;
- a Z-slide displaceable on said machine frame in a Z-direction in relation to said workpiece spindle and having a Z-axis drive, said Z-direction being generally parallel to said C-axis;
- an X-axis drive in the form of a linear motor arranged on said Z-slide for advancing a tool in an X-direction generally transverse to said C-axis towards said workpiece, said X-axis drive comprising a movable member;
- a tool seated in a tool holder, said tool holder being exchangeably supported by said movable member and guided in defined X-positions by a stop surface;
- an X-axis sensor for detecting said X-positions during machining of said workpiece, said stop surface defining a gauged surface with respect to said X-axis for exact positioning of said tool holder; and
- a numerical control system for activating said X-axis drive in correlation with a rotation of said workpiece spindle.

45. A device for the non-circular machining of workpieces comprising:
- a machine frame;
- a workpiece spindle held on said machine frame and rotatable about a C-axis for a workpiece to be machined;
- a Z-slide displaceable on said machine frame in a Z-direction in relation to said workpiece spindle and having a Z-axis drive, said Z-direction being generally parallel to said C-axis;
- an X-axis drive in the form of a linear motor arranged on said Z-slide for advancing a tool carrier in an X-direction generally transverse to said C-axis towards said workpiece, said tool carrier bearing a tool;

an X-axis sensor for determining an X-position of said tool during a machining of said workpiece, said X-axis sensor having a point of application for measurements arranged in an end region of said tool carrier on a tool side thereof; and a numerical control system for activating said X-axis drive in correlation with a rotation of said workpiece spindle.

46. A device as defined in claim 45 wherein said X-axis sensor comprises a laser interferometer.

47. A device as defined in claim 46, wherein said laser interferometer comprises a reflector coupled in a temperature-stable manner with said point of application for measurements.

48. A device as defined in claim 47, wherein said reflector is arranged at said point of application for measurements.

49. A device as defined in claim 47, wherein said laser beam of said laser interferometer is guided by a light guide to said reflector.

50. A device as defined in claim 47, wherein said reflector is connected to said point of application for measurements via an intermediate element having temperature-invariant dimensions.

51. A device as defined in claim 50, wherein said intermediate element is guided through said tool carrier.

52. A device as defined in claim 51, wherein said intermediate element is guided from a rear end of said tool carrier located opposite said tool in the longitudinal direction through said tool carrier as far as said point of application for measurements.

53. A device as defined in claim 46, wherein said laser beam of said laser interferometer is guided through a channel.

54. A device as defined in claim 53, wherein said channel is guided through said tool carrier as far as said point of application for measurements.

55. A device as defined in claim 45, wherein said point of application for measurements of said X-axis sensor lies in the immediate vicinity of a gauged stop surface on said tool carrier.

56. A device as defined in claim 45, wherein said point of application for measurements of said X-axis sensor lies on said tool holder.

57. A device as defined in claim 45, wherein said X-axis sensor is a linear incremental sensor.

58. A device as defined in claim 45, wherein a channel for said X-axis sensor runs through said tool carrier.

* * * * *